United States Patent [19]
Reasoner

[11] Patent Number: 5,664,462
[45] Date of Patent: Sep. 9, 1997

[54] MID-LENGTH ADJUSTMENT AND METHOD OF ASSEMBLY

[75] Inventor: Michael Reasoner, Ortonville, Mich.

[73] Assignee: Teleflex Incorporated, Plymouth Meeting, Pa.

[21] Appl. No.: 723,063

[22] Filed: Oct. 1, 1996

Related U.S. Application Data

[63] Continuation-in-part of Ser. No. 561,405, Nov. 21, 1995, abandoned, which is a continuation-in-part of Ser. No. 521,125, Aug. 29, 1995, Pat. No. 5,577,415, and a continuation-in-part of Ser. No. 560,803, Nov. 21, 1995.

[51] Int. Cl.$^6$ .................................................. F16C 1/14
[52] U.S. Cl. ............................. 74/502.4; 74/502.6
[58] Field of Search ........................... 74/502.4, 502.6, 74/502; 403/327, DIG. 7, 300, 294

[56] References Cited

U.S. PATENT DOCUMENTS

| | | | |
|---|---|---|---|
| 3,513,719 | 5/1970 | Tschanz | 74/502.6 |
| 4,380,178 | 4/1983 | Bennett et al. | 74/502.4 |
| 4,917,418 | 4/1990 | Gokee | 74/502.6 X |
| 5,039,138 | 8/1991 | Dickirson. | |
| 5,531,134 | 7/1996 | Petruccello | 74/502.4 |

FOREIGN PATENT DOCUMENTS

| | | | |
|---|---|---|---|
| 57-83713 | 5/1982 | Japan | 74/502.6 |

Primary Examiner—Charles A. Marmor
Assistant Examiner—Mary Ann Battista
Attorney, Agent, or Firm—Howard & Howard

[57] ABSTRACT

A motion transmitting remote control assembly (10) of the type for transmitting motion in a curved path by a flexible motion transmitting core element and characterized by a rod (44) secured to the outer end of the first core element section (12) for liming sliding movement of the first core element section (12) into the first conduit (16) at a retracted stop position with a female member (28) being in overlapping relationship with the bore (32) at the open end (36) to prevent the female member (28) from completely exiting the bore (32) at the refracted stop position. The method of assembly includes sliding the first core element section (12) into the first conduit (16) to move the female member (28) into the bore (32) and engage the bottom (34) to extend the outer end of the first core element section (12) from the outer end (40) of the first conduit (16) to establish an extended stop position, securing a rod (44) to the outer end of the first core element section (12) to establish a retracted stop position to limit movement (x) of the first core element section (12) to prevent the female member (28) from completely exiting the bore (32) so that the female member (28) remains in overlapping relationship with the bore (32) in the retracted stop position. More specifically, the first core element section (12) is inserted into the rod (44) while inserting the end (46) of the rod (44) into a swivel tube (38) while maintaining the female member (28) bottomed out in the extended portion, and securing the rod (44) to the first core element section (12) at a position exteriorly of the swivel tube (38) whereby the rod (44) is prevented from completely exiting the swivel tube (38) into the extended position.

27 Claims, 4 Drawing Sheets

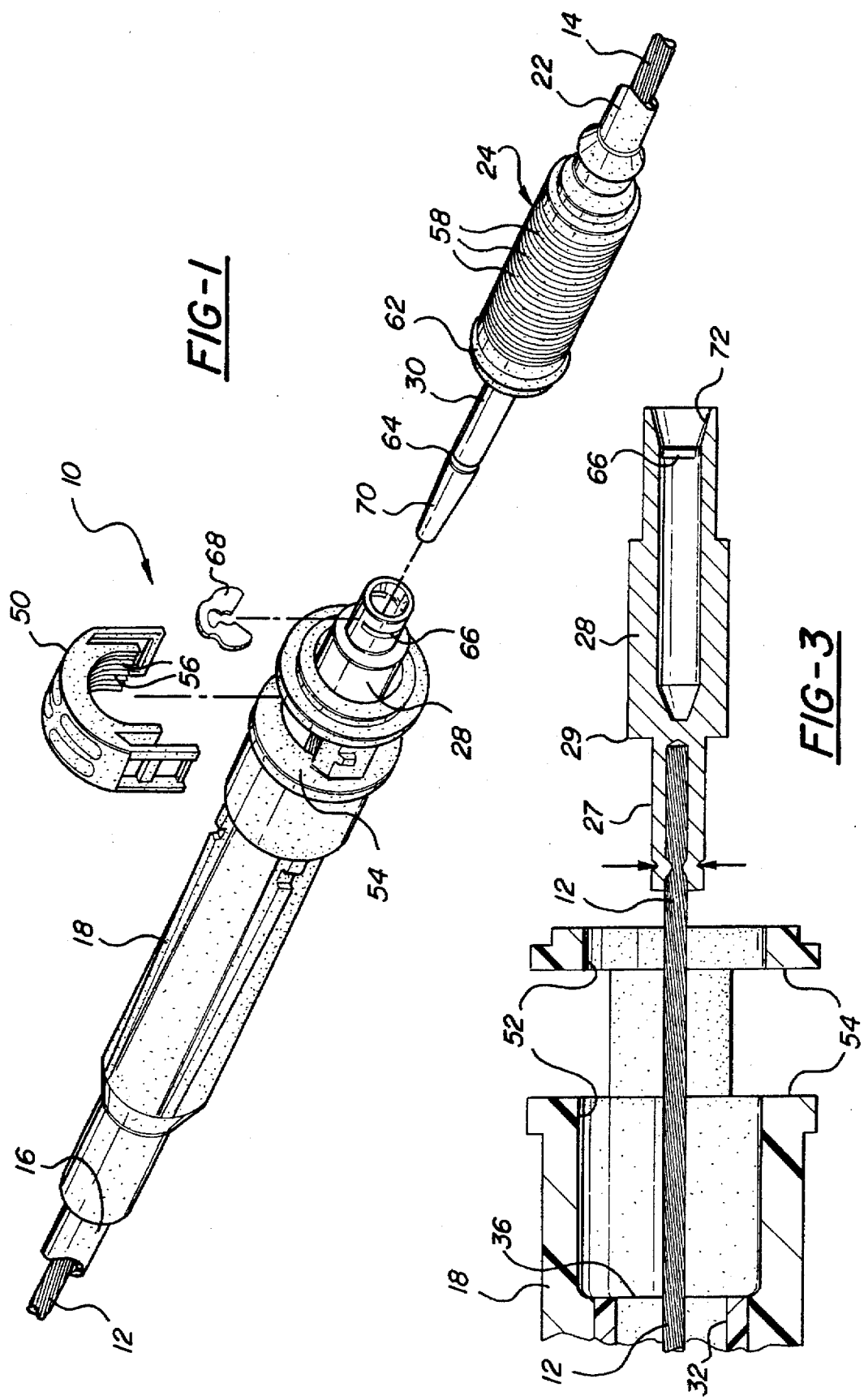

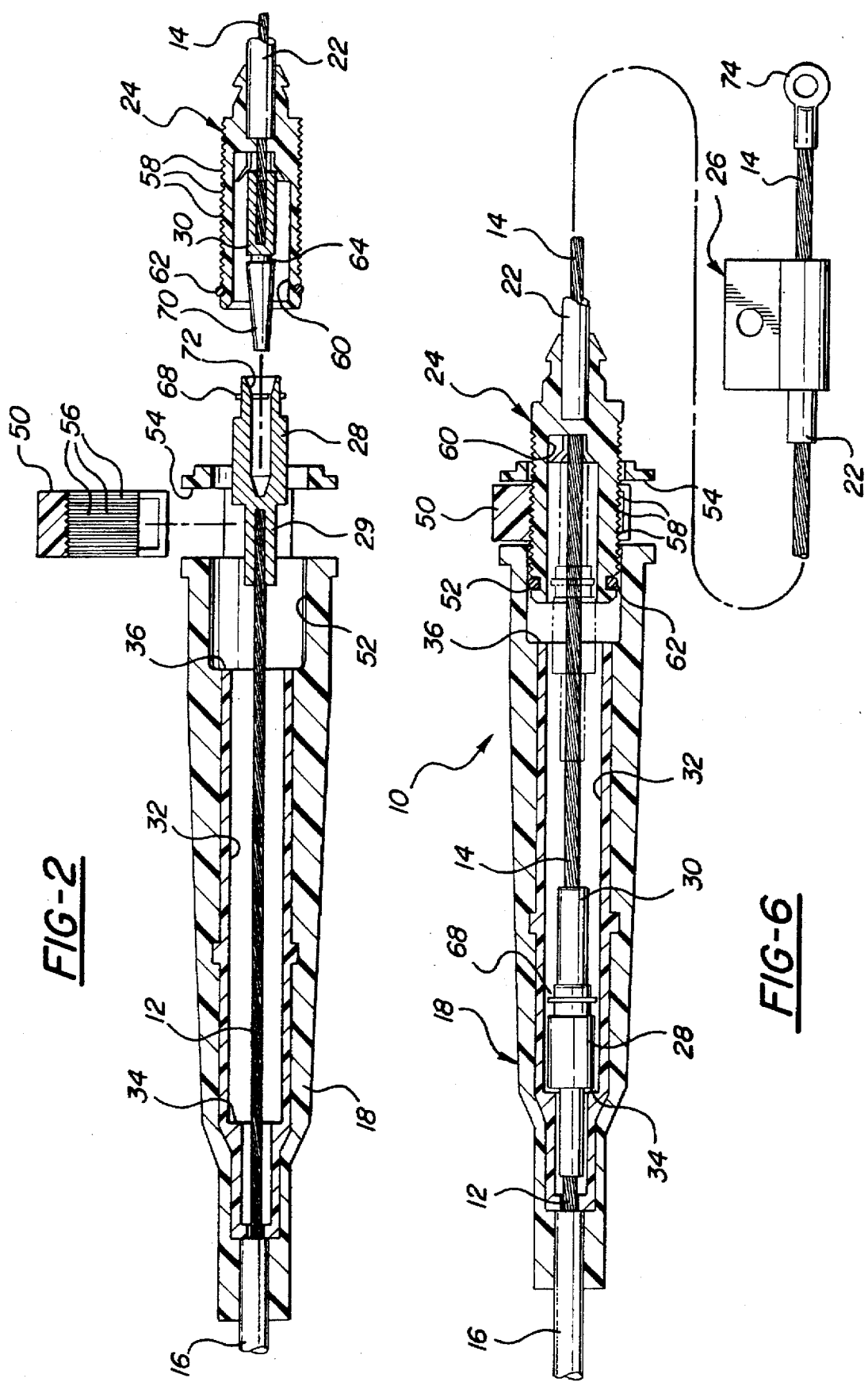

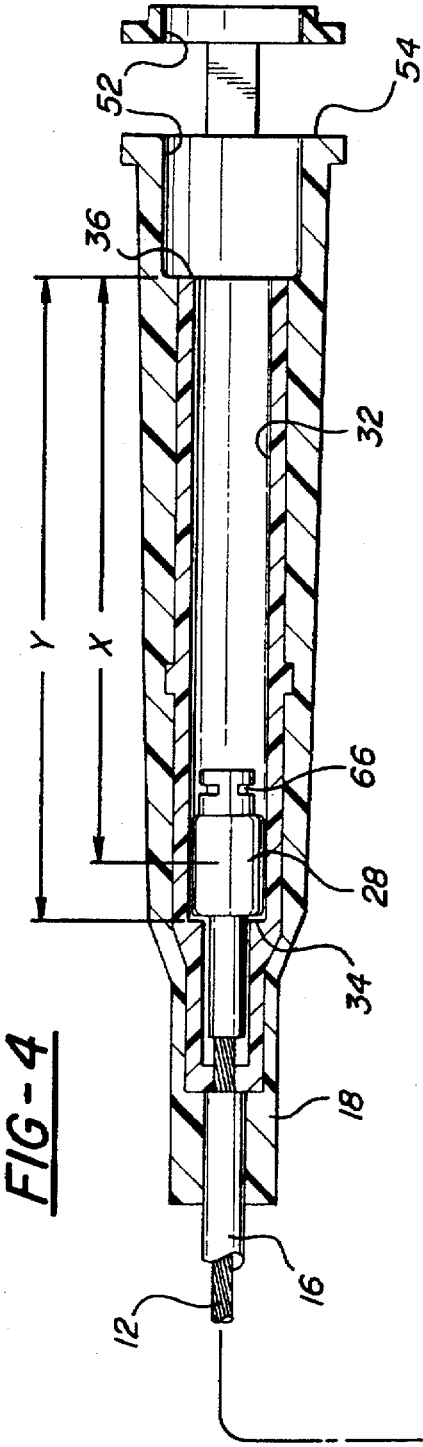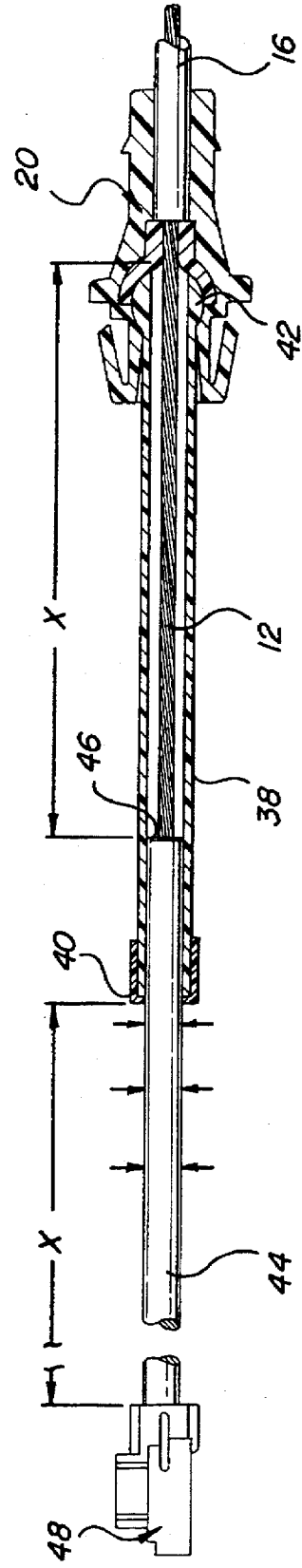
FIG-4

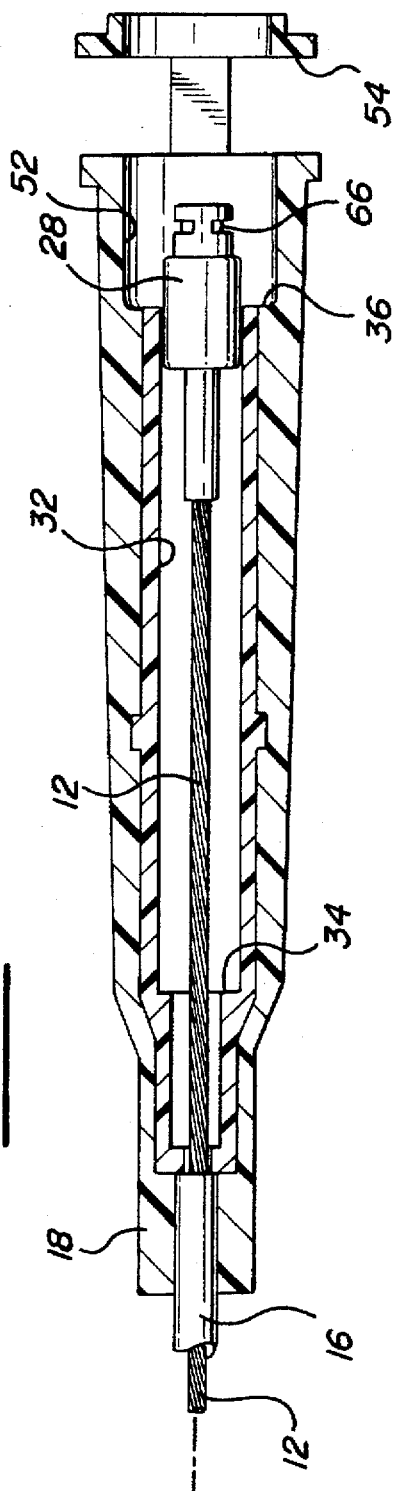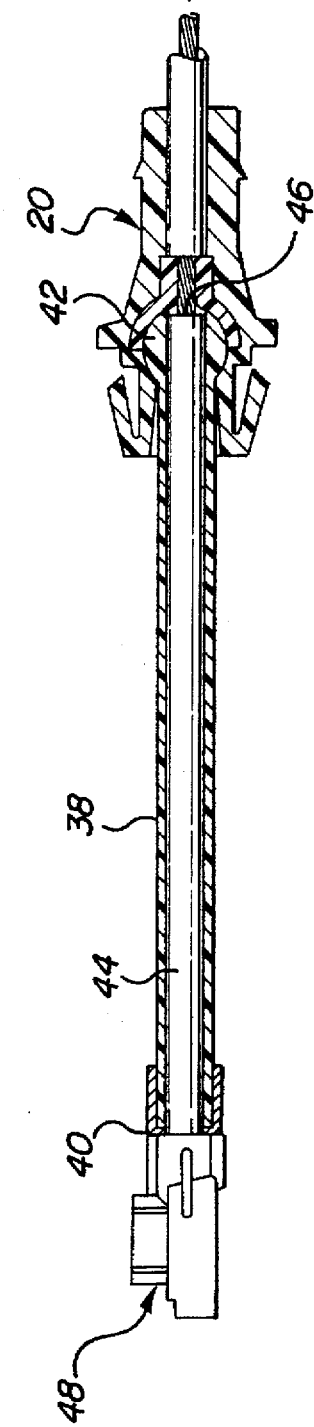
FIG-5

MID-LENGTH ADJUSTMENT AND METHOD OF ASSEMBLY

RELATED APPLICATIONS.

This application is a continuation-in-part of application Ser. No. 08/561,405, filed Nov. 21, 1995, now abandoned which is in turn a continuation-in-part of applications Ser. No. 08/521,125 filed Aug. 29, 1995, now U.S. Pat. No. 5,577,415, and Ser. No. 08/560,803 filed Nov. 21, 1995, both in the name of the inventor hereof and assigned to the assignee of the subject invention.

TECHNICAL FIELD

The subject invention relates to a remote control assembly of the type for transmitting motion in a curved path by a flexible motion transmitting core element and, more specifically, to such and assembly which is manufactured in two axial separate parts which are mated during installation.

BACKGROUND OF THE INVENTION

Such remote control assemblies are used in automotive vehicles. For example, such a remote control assembly may interconnect the accelerator pedal and the fuel flow controls system in an automobile. In numerous installations it is necessary to attach the outward ends of the two halves to a support structure before the routing of the conduit can be completed, as, for example, when the two halves are connected to two separate vehicle components before those components are assembled on the assembly line. Such assemblies are divided into a first guide or conduit movably supporting a first core element section and a second guide or conduit movably supporting a second core element section with means for connecting the core element sections together. For purposes of installation, it is necessary that the core element sections be easily connected to one another. It is also necessary that the conduits or guides be easily connected. One such assembly known in the prior art is disclosed in U.S. Pat. No. 5,039,138 to Dickirson. However, it frequently occurs that the environment requires that the assembly be installed before the core element sections and the conduits or guides are finally connected together. In order to accomplish this mode of installation it is necessary that the assembly be free of binding up during such installation.

SUMMARY OF THE INVENTION AND ADVANTAGES

The invention includes an assembly and the method of assembling the motion transmitting remote control assembly of the type for transmitting motion in a curved path by a flexible motion transmitting core element and including a first guide length having inner and outer ends, a second guide length having inner and outer ends, a first core element section having inner and outer ends and movably supported in the first guide length, a second core element section having inner and outer ends and movably supported in the second guide length, first and second members disposed on the inner ends of the core element sections for connecting the first and second core elements together, first and second fittings disposed at the inner ends of the guide lengths for connecting the first and second guide lengths together, a terminal means disposed at the outer end of first core element section for connection to a control member, the first fitting having a bore with a bottom and the first member being slidably supported in the bore.

The assembly is characterized by a terminal means disposed at the outer end of the first core element section for connection to a control member and for limiting sliding movement of the first core element section into the first guide length at a retracted stop position with the first member being in overlapping relationship with the bore at the open end to prevent the first member from completely exiting the bore in the retracted stop position.

The method comprises the steps of securing the first member to the inner end of the first core element section, sliding the first core element section in the first guide length to move the first member into the bore and to extend the outer end of the first core element section from the outer end of the first guide length, and securing the terminal means to the outer end of the first core element section to establish a retracted stop position to limit movement of the first core element section to prevent the first member from completely exiting the bore so that the first member remains in overlapping relationship with the bore in the retracted stop position.

Accordingly, the two inner ends of the core element sections and the first and second fittings may be provisional disposed in overlapping relationship with the outer ends of the guide lengths and core element sections connected to control members so that the control members may be moved to an extreme position to force the two fittings and core element sections together to connect the core element sections without binding or hangups internally of the guide lengths.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is an exploded perspective view of a preferred embodiment of the subject invention;

FIG. 2 is a longitudinal cross sectional view of the assembly of FIG. 1;

FIG. 3 is an enlarged fragmentary cross sectional view showing the female member being secured to the inner end of the first core element section;

FIG. 4 is a longitudinal cross sectional view showing the terminal rod being secured to the outer end of the first core element section in the fully extended position;

FIG. 5 is a view like FIG. 4 but showing the assembly in the fully retracted position; and FIG. 6 is a longitudinal cross sectional view showing the fully installed and assembled condition.

DETAILED DESCRIPTION OF THE PREFERRED EMBODIMENT

Referring to the Figures, wherein like numerals reference like or corresponding parts throughout the several views, a motion transmitting remote control assembly assembled in accordance with the subject invention is generally indicated at 10. The assembly 10 is of the type for transmitting motion in a curved path by a flexible motion transmitting core element, and, more specifically, a core element comprising a first core element section 12 and a second core element section 14.

A first guide length having inner and outer ends slidably supports the first core element section 12 and includes a first conduit 16 extending between a first fitting 18 at the inner end thereof and a swivel fitting 20 at the outer end thereof. A second guide length having inner and outer ends slidably supports the second core element section 14 and includes a second conduit 22 extending between a second fitting 24 at the inner end thereof and a support fitting 26 at the outer end thereof. The swivel fitting 18 and the support fitting 26 are constructed for attachment to a support structure. The first and second fittings 18 and 24 are disposed at the inner ends of the guide lengths for connecting the first and second guide lengths together, as will become more clear hereinafter. The core element sections 12 and 14 are connected together by first and second or female and male members 28 and 30 disposed on the respective inner ends of the core element sections 12 and 14 for connecting the first and second core elements together, which will also become more clear hereinafter.

The first fitting 18 has a bore 32 extending thereinto with a length (y as indicated in FIG. 4) which extends between a bottom 34 and an open end 36. The first or female member 28 is slidably supported in the bore 32. As illustrated, the first fitting 18 comprises an inner liner which defines the bore 32 and an outer shell disposed about and bonded to the inner liner, but the fitting 18 could be one homogeneous member.

The assembly 10 is characterized by a terminal means disposed at the outer end of first core element section 12 for connection to a control member (not shown) and for limiting sliding movement of the first core element section 12 into the first guide length at a retracted stop position (shown in FIG. 5) with the first or female member 28 being in overlapping relationship with the bore 32 at the open end 36 to prevent the female member 28 from completely exiting the bore 32 in the retracted stop position. The female member 28 has shank portion 27 and a larger body portion to define a shoulder 29 therebetween. The bottom 34 of the bore 32 presenting an annular shoulder for engaging the body portion about the shank 27 to limit inward movement of the female member 28 at an extended stop position within the bore 32, as shown in FIGS. 4 and 6. The distance (x as shown in FIG. 4) between the stop positions is less than the distance (y) between open end 36 and the bottom 34 of the bore 32.

A swivel tube 38 has a distal end 40 and a spherical swivel end 42 supported by concave spherical pocket in the swivel fitting 20 for swivelling movement relative thereto. The terminal means includes a rod or shaft 44 attached to the outer end of the first core element section 12 and including an inward end 46 slidably supported in the swivel 38 tube and a first terminal 48 disposed on the outward end of the rod 44 for connection to the control member (not shown). The terminal 48 may be anyone of the plastic configurations bonded to the rod 44 and well known in the art.

The method of assembling or fabricating the assembly 10 includes the initial step of securing the female member 28 to the inner end of the first core element section 12, as illustrated in FIG. 3. As illustrated in FIG. 3, the end of the first core element section 12 is inserted into a bore in the female member 28 and thereafter the reduced diameter shank portion of the female member 28 is crimped or swaged to mechanically grip the first core element section 12, thereby preventing the removal of the female member 28 from the first core element section 12. This step may occur as a separate operation to inventory first core element sections 12 with female members staked thereto or the staking may take place with the first core element extending from the first fitting 18. Thereafter, the method continues by sliding the first core element section 12 in the conduit 16 of the first guide length to move the first or female member 28 into the bore 32 and to extend the rod 44 at the outer end of the first core element section 12 from the outer end of the first guide length as defined by the distal end 40 of the swivel tube 38. More specifically, the first or female member 28 is moved into the bore 32 to engage the bottom 34 of the bore 32 to limit further movement of the first core element section 12 to establish an extended position, as shown in FIG. 4 and in full lines in FIG. 6.

The method continues by securing the rod 44 of the terminal means to the outer end of the first core element section 12 to establish a retracted stop position to limit movement of the first core element section 12 to prevent the first or female member 28 from completely exiting the bore 32 so that the female member 28 remains in overlapping relationship with the bore 32 in the retracted stop position, as shown in FIG. 5 and in phantom in FIG. 6. This step is further defined as securing the rod 44 to the first core element section 12 at a position outside the swivel tube 38 to establish the retracted stop position, i.e., the core element section 12 extends into the rod 44 outside the swivel tube 38 for crimping of the rod 44 into the core element section 12. The retracted position is established by one of the first terminal 48 abutting the distal end 40 of the swivel tube 38 and/or the inward end 46 of the rod 44 bottoming out at the swivel end of the swivel tube 38. As illustrated in FIG. 5, both the first terminal 48 and the inward end 46 of the rod 44 reach abutting positions to establish the retracted position; however, in practice either the terminal 48 will engage the distal end 40 of the swivel tube 38 before the end 46 of the rod bottoms out or the end 46 of the rod 44 will bottom out before the terminal 48 abuts the distal end 40 of the swivel tube 38. In either case the distance (x) between the extended and retracted stop positions is less than the length (y) of the bore 32.

The first 18 and second 24 fittings telescope together for adjustment of the overall distance between the outer ends of the guide lengths, Le., the overall length of the assembly 10. A lock button 50 moves between an unlocked position and a locked position for locking the fittings 18 and 24 together in a fixed adjusted axial position to prevent relative telescoping movement therebetween. The first fitting 18 includes a counterbore 52 extending thereinto with the open end 36 of the bore 32 being at the bottom of the counterbore 52. The second fitting 24 is slidably disposed in the counterbore 52 for effecting the adjustment of the total length of the assembly as defined by the distance between the outer ends of the assembly. The first fitting 18 has a pocket 54 extending radially into the counterbore 52 and the lock button 50 is disposed in the pocket 54 for movement radially between locked and unlocked positions, the locked position shown only in FIG. 6. The lock button 50 and the second fitting 24 have co-acting teeth 56 and 58, respectively, for meshing engagement in the locked position to prevent relative axial movement therebetween. The lock button 50 and the first fitting 18 also include co-acting detents for retaining the lock button in the unlocked position attached to the first fitting 18 and the locked position with the teeth 56 and 58 in meshing engagement.

The second fitting 24 includes a passage 60 extending thereinto for receiving the first or female member 28. Therefore, the passage 60 is at least equal in diameter to the bore 32. An annular seal or O-ring 62 is disposed about the second fitting 24 for sealing engagement with the cylindrical walls of the counterbore 52.

The female 28 and male 30 members include connection means for connecting the female and male members together in a connected position mechanically prevented from moving relative to one another axially in either direction. More specifically, the male member 30 presents a male groove 64 and the female member 28 presents a female groove 66 and the connection means includes a clip 68 for disposition in mechanical overlapping relationship with both of the grooves 64 and 66 in the connected position. The clip 68 snaps into the mechanical overlapping relationship during insertion of the male member 30 into the female member 28. In order to facilitate this connection, the male member 30 presents a conical nose 70 for guiding the male member 30 into the female member 28 and the female member 28 includes a taper 72 extending thereinto for receiving and guiding the conical nose 70, the taper 72 extending into the female member 28 from its receiving end to the groove or slots 66 therein. The clip 68 defines a snap-together connector 68 for connecting the male and female members 28 and 30 together in response to being forced together.

A second terminal 74 is disposed at the outer end of the second core element section, as shown in FIG. 6.

Once the steps have been completed to stake the female member 24 to the inner end of the first core element section 12 and bottoming the female member at the bottom 34 of the bore 32 to stake the rod 44 to the outer end of the first core element section 12 to establish a travel distance (x) which is less than the length (y) of the bore 32, both halves of the assembly may be installed in a vehicle. The method therefore continues by attaching the swivel fitting 20 and the support fitting 26 to structure in the vehicle. The conical nose 70 is merely laid in the entry of the taper 72 with the second fitting 24 disposed in the counterbore 52 for free sliding or telescoping movement in the counterbore 52 of the first fitting 18. The terminals 48 and 74 are attached to control members and the control members moved to an extreme operating position. This action forces the conical nose 70 into the taper 72 to expand the clip 66 until the clip 66 snaps into the groove 64 in the male member 30. This action simultaneously moves the second fitting 24 axially relative to the first fitting 18 to reach the overall operating length of the conduits 16 and 22, at which position the lock button will be moved to the locked position to engage the teeth 56 and 58.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly (10) comprising:

a first guide length having inner and outer ends;

a second guide length having inner and outer ends;

a first core element section (12) having inner and outer ends and movably supported in said first guide length;

a second core element section (14) having inner and outer ends and movably supported in said second guide length;

first (28) and second (30) members disposed on said inner ends of said core element sections (12 and 14) for connecting said first (12) and second (14) core element sections together;

said guide lengths including first (18) and second (24) fittings disposed at said inner ends of said guide lengths for connecting said first and second guide lengths together;

said first fitting (18) having a bore (32) with an open end (36) and said first member (28) being slidably supported in said bore (32);

said assembly characterized by a terminal means disposed at said outer end of said first core element section (12) for connection to a control member and for limiting sliding movement of said first core element section (12) into said first guide length at a retracted stop position with said first member (28) being in overlapping relationship with said bore (32) at said open end (36) to prevent said first member (28) from completely exiting said bore (32) in said retracted stop position.

2. An assembly as set forth in claim 1 wherein said bore (32) has a bottom (34) presenting an annular shoulder for engaging and limiting inward movement of said first member (28) at an extended stop position within said bore (32).

3. An assembly as set forth in claim 2 wherein the distance (x) between said stop positions is less than the distance (y) between said open end (36) and said bottom of said bore (32).

4. An assembly as set forth in claim 3 wherein said first (18) and second (24) fittings telescope together for adjustment of the overall distance between said outer ends of said guide lengths, and including a lock button (50) for movement between an unlocked position and a locked position for locking said fittings (18 and 24) together in a fixed adjusted position to prevent relative telescoping movement therebetween.

5. An assembly as set forth in claim 4 wherein said first fitting (18) includes a counterbore (52) extending thereinto with said open end (36) of said bore (32) being at the bottom of said counterbore (52), said second fitting (24) being slidably disposed in said counterbore (52) for said adjustment.

6. An assembly as set forth in claim 5 wherein said second fitting (24) includes a passage (60) extending thereinto for receiving said first member (28).

7. An assembly as set forth in claim 6 wherein said passage (60) is equal in diameter to said bore (32).

8. An assembly as set forth in claim 6 including an annular seal (62) disposed about said second fitting (24) for sealing engagement with said counterbore (52).

9. An assembly as set forth in claim 6 wherein said first guide length includes a swivel fitting (42) at said outer end thereof, a swivel tube (38) having a distal end (40) and a swivel end supported by said swivel fitting (42) for swivelling movement relative thereto, and said terminal means includes a rod (44) attached to said outer end of said first core element section (12) and including an inward end (46) slidably supported in said swivel tube (38) and a first terminal (48) disposed on an outward end of said rod (44) for connection to the control member.

10. An assembly as set forth in claim 9 wherein said retracted stop position is established by one of said first terminal (48) abutting said distal end (40) of said swivel tube (38) and said inward end (46) of said rod (44) bottoming out at said swivel end of said swivel tube (38).

11. An assembly as set forth in claim 10 wherein said first member (28) is a female member and said second member (30) is a male member, said female (28) and male (30) members including connection means for connecting said female (28) and male (30) members together in a connected position mechanically prevented from moving relative to one another axially in either direction.

12. An assembly as set forth in claim 11 wherein said male member (30) presents a male groove (64) and said female member (28) presents a female groove (66) and said connection means includes a clip (68) for disposition in mechanical overlapping relationship with both of said grooves (64 and 66) in said connected position.

13. An assembly as set forth in claim 12 wherein said clip (68) snaps into said mechanical overlapping relationship during insertion of said male member (30) into said female member (28).

14. An assembly as set forth in claim 13 wherein said first guide length includes a first conduit (16) extending between said first fitting (18) and said swivel fitting (42), said first fitting (18) having a pocket (54) extending radially into said counterbore (52), said lock button (50) being disposed in said pocket (54) for movement radially between said locked and unlocked positions, said second fitting (24) and said lock button (50) having co-acting teeth (56 and 58) for meshing engagement in said locked position, said male member (30) presents a conical nose (70) for guiding said male member (30) into said female member, said female member (28) including a taper (72) extending thereinto for receiving said conical nose (70), said taper (72) extending into said female member (28) to said female groove (66) therein, said second guide length including a second conduit (22) extending from said second fitting (24) and a support fitting (26) on said second conduit at said outer end of said second guide length, and a second terminal (74) at said outer end of said second core element section (14).

15. A motion transmitting remote control assembly (10) comprising:

a first core element section (12) having an inner end and an outer end;

a first conduit (16) having inner and outer ends and slidably supporting said first core element section (12);

a first fitting (18) disposed on the inner end of said conduit (16), said fitting (18) having a bore (32) extending thereinto having a length (y) extending between an open end (36) and a bottom (34) with a counterbore (52) at the open end (36) of said bore (32), said counterbore (52) having a larger diameter than said bore (32);

a female member (28) secured to said inner end of said core element section (12) and in sliding engagement with said bore (32), said female member (28) having a shank portion (27) and a larger body portion defining a shoulder (29) therebetween to engage said bottom (34) of said bore (32) to define an extended position for said first core element section (12);

a second core element section (14) having inner and outer ends;

a guide length for slidably supporting said second core element section (14) and including a second fitting (24) larger in diameter than said bore (32) and slidably disposed in said counterbore (52), said second fitting (24) including an interior passage (60) having a diameter equal to the diameter of said bore (32) for receiving said female member (28);

a male member (30) disposed at said inner end of said second core element section (14);

a snap-together connector (68) for connecting said male and female members (28 and 30) together in response to being forced together;

a lock button for locking said first (18) and second (24) fittings together to prevent relative axial movement therebetween;

said assembly characterized by a first terminal means (44, 48) secured to said outer end of said first core element section (12) for limiting sliding movement of said first core element section (12) into said first conduit (16) at a retracted stop position with said female member (28) being in overlapping relationship with said bore (32) at said open end (36) to prevent said female member (28) from completely exiting said bore (32) in said retracted stop position.

16. An assembly as set forth in claim 15 wherein the distance (x) between said extended and retracted stop positions is less than the distance (y) between said open end (36) and said bottom (34) of said bore (32).

17. A method of assembling a motion transmitting remote control assembly (10) including a first guide length having inner and outer ends, a second guide length having inner and outer ends, a first core element section (12) having inner and outer ends and movably supported in the first guide length, a second core element section (14) having inner and outer ends and movably supported in the second guide length, first (28) and second (30) members disposed on the inner ends of the core element sections (12 and 14) for connecting the first (12) and second (14) core element sections together, first (18) and second (24) fittings disposed at the inner ends of the guide lengths for connecting the first and second guide lengths together, a terminal means disposed at the outer end of the first core element section (12) for connection to a control member, the first fitting (18) having a bore (32) with a bottom and the first member (28) being slidably supported in the bore (32), said method comprising the steps of:

securing the first member (28) to the inner end of the first core element section (12);

sliding the first core element section (12) in the first guide length to move the first member (28) into the bore (32) and to extend the outer end of the first core element section (12) from the outer end of the first guide length;

securing the terminal means to the outer end of the first core element section (12) to establish a retracted stop position to limit movement of the first core element section (12) to prevent the first member (28) from completely exiting the bore (32) so that the first member (28) remains in overlapping relationship with the bore (32) in the retracted stop position.

18. A method as set forth in claim 17 further defined as moving the first member (28) into the bore (32) to engage the bottom (34) of the bore (32) to limit further movement of the first core element section (12) to establish an extended stop position.

19. A method as set forth in claim 18 wherein the first guide length includes a swivel fitting (42) at the outer end thereof, a swivel tube (38) having a distal end (40) and a swivel end supported by the swivel fitting (42) for swivelling movement relative thereto, and the terminal means includes a rod (44) attached to the outer end of the second core element section (14) and including an inward end (46) slidably supported in the swivel tube (38) and a first terminal (48) disposed on an outward end of the rod (44) for connection to the control member, the method further defined as inserting the first core element section (12) into the rod (44) while inserting the rod (44) into the swivel tube (38) and maintaining the first member (28) in the extended position, and securing the rod (44) to the first core element section (12) exteriorly of the swivel tube (38) whereby the rod (44) is prevented from completely exiting the swivel tube (38) in the extended position.

20. A method as set forth in claim 19 further defined as securing the rod (44) to the first core element section (12) to establish the retracted stop position by one of the first terminal (48) abutting the distal end of the swivel tube (38) and the inward end (46) of the rod (44) bottoming out at the swivel end of the swivel tube (38).

21. A method as set forth in claim 20 wherein the distance (x) between the retracted and extended stop positions is less than the length (y) of the bore (32).

22. A method as set forth in claim 21 including installation of the assembly comprising the steps of connecting the first (28) and second (30) members thereby connecting the first (12) and second (14) core element sections together, connecting the first (18) and second (24) fittings thereby connecting the first and second guide lengths together.

23. A method of assembling a motion transmitting remote control assembly (10) including a first core element section (12) having inner and outer ends, a first conduit (16) having inner and outer ends and slidably supporting the first core element section (12), a first fitting (18) disposed on the inner end of the conduit (16), the fitting (18) having a bore (32) extending thereinto with a length (y) extending between an open end (36) and a bottom (34) with a counterbore (52) at the open end (36) of the bore (32), the counterbore (52) having a larger diameter than the bore (32), a female member (28) secured to the inner end of the core element section (12) and in sliding engagement with the bore (32), the female member (28) having a shank portion (27) and a larger body portion defining a shoulder (29) therebetween to engage the bottom (34) of the bore (32) to define an extended position for the first core element section (12), a second core element section (14) having inner and outer ends, a guide length for slidably supporting the second core element section (14) and including a second fitting (24) larger in diameter than the bore (32) and slidably disposed in the counterbore (52), the second fitting (24) including an interior passage (60) having a diameter equal to the diameter of the bore (32) for receiving the female member (28), a male member (30) disposed at the inner end of the second core element section (14), a snap-together connector (68) for connecting the female and male members (28 and 30) together in response to being forced together, a lock button for locking the first (18) and second (24) fitting together to prevent relative axial movement therebetween, said method comprising the steps of:

securing the female member (28) to the inner end of the first core element section (12);

sliding the first core element section (12) into the first conduit (16) to move the female member (28) into the bore (32) and engage the bottom (34) to extend the outer end of the first core element section (12) from the outer end of the first conduit (16) to establish an extended stop position;

securing a terminal means (44, 48) to the outer end of the first core element section (12) to establish a retracted stop position to limit movement (x) of the first core element section (12) to prevent the female member (28) from completely exiting the bore (32) so that the female member (28) remains in overlapping relationship with the bore (32) in the retracted stop position.

24. A method as set forth in claim 23 wherein the distance (x) between the retracted and extended stop positions is less than the length (y) of the bore (32).

25. A method as set forth in claim 24 including installation of the assembly (10) comprising the steps of placing the male member (30) within the female member (28) and the second fitting (24) within the counterbore (52), attaching a portion (20) of the first conduit (16) and the guide length (26) to a support structure, connecting the terminal means (48) to a control member and connecting the outer end (74) of the second core element section (14) to a control member, moving the control members to an extreme operating position to force the male member (30) into the female member (28) to engage the snap-together connector to connect the female (28) and male (30) members thereby connecting the first (12) and second (14) core element sections together while simultaneously telescoping the second fitting (24) within the counterbore (52) of the first fitting (18) and moving the lock button (50) to connect the first (18) and second (24) fittings thereby fixing the overall length of the assembly.

26. A method as set forth in claim 25 including a swivel fitting (42) at the outer end of the first conduit (16), a swivel tube (38) having a distal end (40) and a swivel end supported by the swivel fitting (42) for swivelling movement relative thereto, and the terminal means includes a rod (44) attached to the outer end of the second core element section (14) and including an inward end (46) slidably supported in the swivel tube (38) and a first terminal (48) disposed on an outward end of the rod (44) for connection to the control member, the method further defined as inserting the first core element section (12) into the rod (44) while inserting the rod (44) into the swivel tube (38) and maintaining the female member (28) in the extended position, and securing the rod (44) to the first core element section (12) exteriorly of the swivel tube (38) whereby the rod (44) is prevented from completely exiting the swivel tube (38) in the extended position.

27. A method as set forth in claim 26 further defined as securing the rod (44) to the first core element section (12) to establish the retracted stop position by one of the first terminal (48) abutting the distal end (40) of the swivel tube (38) and the inward end (46) of the rod (44) bottoming out at the swivel end of the swivel tube (38).

* * * * *